Figure 1:
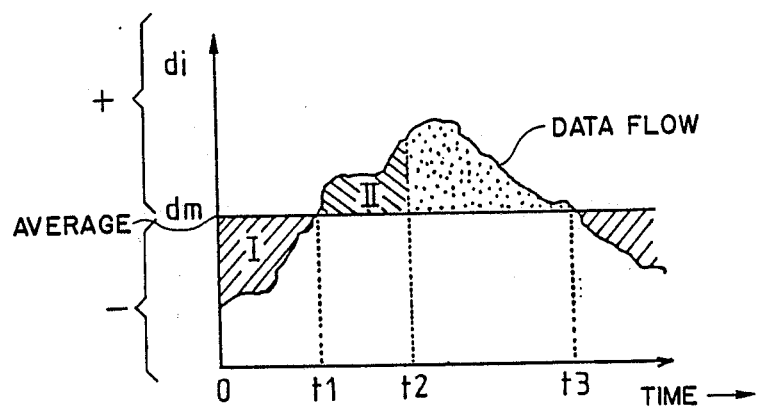

United States Patent [19]

Lespagnol et al.

[11] Patent Number: 4,896,316
[45] Date of Patent: Jan. 23, 1990

[54] METHOD AND SYSTEM OF CONTROL OF FLOW OF DATA PACKETS

[75] Inventors: Albert Lespagnol, Perros-Guirec; Jacques Y. Kerberenes, Lannion, both of France

[73] Assignee: L'etat Francais, Represente par le Ministre des PTT Centre National d'Etudes des Telecommunications (CNET), France

[21] Appl. No.: 182,940

[22] Filed: Apr. 18, 1988

[30] Foreign Application Priority Data

May 26, 1987 [FR] France ................... 87 07556

[51] Int. Cl.$^4$ .............................. H04J 3/26
[52] U.S. Cl. ........................... 370/60; 370/94.1; 340/825.5
[58] Field of Search ............. 370/60, 94, 85, 89; 340/825.5, 825.51

[56] References Cited

U.S. PATENT DOCUMENTS

| | | |
|---|---|---|
| 4,475,192 | 10/1984 | Fernow et al. ............... 370/94 |
| 4,536,875 | 8/1985 | Kume et al. .................. 370/94 |
| 4,769,810 | 9/1988 | Eckberg et al. ............... 370/60 |
| 4,769,811 | 9/1988 | Eckberg et al. ............... 370/60 |

Primary Examiner—Douglas W. Olms
Attorney, Agent, or Firm—Laff, Whitesel, Conte & Saret

[57] ABSTRACT

The packet flow of each virtual circuit is measured and compared to an allocated average value. At each transmission authorization request (DAE'), when found to be less than the average value, a positive difference brings about an authorization to transmit and is translated into a right to transmit which is proportional to the time span since the previous request, the right to transmit being accumulated. When it is found to be greater than the average value, a negative difference brings about, if the number of accumulated transmission rights is positive, on one hand, the authorization to transmit and, on the other hand, a decrementing of the accumulated number, and if the accumulated number is nil, a refusal of authorization to transmit.

Some examples of systems carrying out the process are described.

The process and systems are applicable in particular to packets carried by asynchronous time multiplexers.

7 Claims, 4 Drawing Sheets

METHOD AND SYSTEM OF CONTROL OF FLOW OF DATA PACKETS

The present invention relates to a system for controlling the flow of packets carried by asynchronous time division multiplexers.

The routing of whatever flows and the sharing of the same transmission resources constitutes the main concern of the asynchronous time method of transmission. In fact, asynchronous time division multiplexing allows the transmission on the same facility, that is the asynchronous time multiplexing, of packets belonging to different virtual circuits. Each packet is made up of a label identifying the virtual circuit to which it belongs and an information block. The maximum number of virtual circuits on a multiplexer is determined by the number of bits in the label.

However, the allocation of resources when setting up the virtual circuits generally relies on rate of activity statistics of the different transmission sources, such that there exists a non-zero risk of information loss through overflow of the queueing files due to instantaneous overloads. We must obviously minimize these losses, but the solution is not easy because the flow generated by the different sources may be constant, variable or sporatic.

In principle, the flow of information generated on a virtual circuit, which shall be designated more simply below by "communication flow" or "virtual circuit flow", must not exceed the flow which was assigned to the virtual circuit or to the communication link when it was established. In practice, the network has no means to limit the flow from a source. A source may thus accidentally or through foul play, generate a flow of information greatly superior to that which it was allocated. The saturation of the network may result at a location distant from the source of transmission and can degrade the quality of the other signals transmitted by the network.

One object of the present invention is to provide a method allowing the guarantee, in real time, of the management of flow of the virtual circuits. Following this method, the flow is monitored of each of the virtual circuits established on the set of time multiplexers of an input switch, in order to prevent bottlenecking and saturation of the network resources triggered by consecutive overloads due either to abnormal operation or due to not respecting the flow threshold for which the communication was established.

Another object of the invention is to provide means allowing the guarantee of source flow control for all the virtual circuits of a multiplexer.

Another object of the invention is to provide means to limit to average flow of a virtual circuit to a value allocated during the establishment of the virtual circuit.

In accordance with one embodiment of the method of the invention, the flow of packets in each virtual circuit is measured and compared to an allocated value and, with each request for transmission, when it is found to be smaller than the allocated value, a positive difference, on one hand, brings about an authorization to transmit and, on the other hand, is translated to right to transmit proportional to the time elapsed since the previous request, the transmission rights being accumulated, or, when it is greater than the said allocated value, the negative difference brings about, if the number of accumulated transmission rights is positive, on one hand, the authorization to transmit, and, on the other hand, the decrementing of the cumulative number, and, if the cumulative number is nil, the refusal to authorize transmission.

In accordance with another embodiment, the method is comprised of initially attributing to a virtual circuit, on one hand, a first number which is later incremented at a fixed rate, and, on the other hand, a second number, each transmission authorization request coming from the virtual circuit bringing about the calculation of the difference between the first and the second number and, when the sign of the difference is positive, the generation of an authorization to transmit as well as the substitution of the value of the difference for the first number, and, if the sign of the difference is negative, the generation of a signal forbidding transmission as well as conserving the first number, the first number representing the accumulation of rights to transmit and the second number being a function of the flow associated with the virtual circuit.

In accordance with the invention, the generation of the signal forbidding transmission is used by switching apparatus of the virtual circuit which transmit towards the source of the virtual circuit a message requesting it to reduce its flow, when this is possible, and, in any case, a message alarming it to the loss of packets.

In accordance with another embodiment of the invention, a first transmission authorization request detector, a clock, a counter, a storage register, a subtractor, a second detector for the sign of the contents of the subtractor, a control unit are provided, the outputs of the counter and the storage register being connected to the operand inputs of the subtractor whose output is connected to the input of the counter, the counter input receiving the periodic clock signal and the storage register being, at the start of establishing the virtual circuit, loaded by the control unit, each output sigal of the first detector triggering the operation of the second detector whose output signal at a low level brings about the transmission of an authorization to transmit and the loading of the result from the subtractor into the counter and, at a high level, brings about the forbidding of transmission.

In accordance with another embodiment of the invention, a system capable of managing all the virtual circuits processed by a switch for packets carried by asynchronous time multiplexers is provided, the system comprising a first memory whose words store the said first numbers, and a second memory whose words store the second numbers, the addresses of the first and second memories being determined by the packet labels entering in the switch, the system comprising also a label receiving circuit used as the first detector, a subtractor, a second detector and a control unit.

In accordance with another embodiment, the control unit has a microprocessor controlling the word cycles of the system, each cycle having three phases: an allocation phase during which one word of the first memory is incremented, the address of the word of the first memory being incremented from one cycle to the next, an authorization phase during which the receiving circuit allows the successive addressing of the first and second memories whose words which are read are subtracted in the subtractor, the second detector generating the authorization or forbidding signal, as well as the loading or not of the contents of the subtractor into the first memory, and an access phase to the control unit to write a new word in the second memory.

Figure 2:
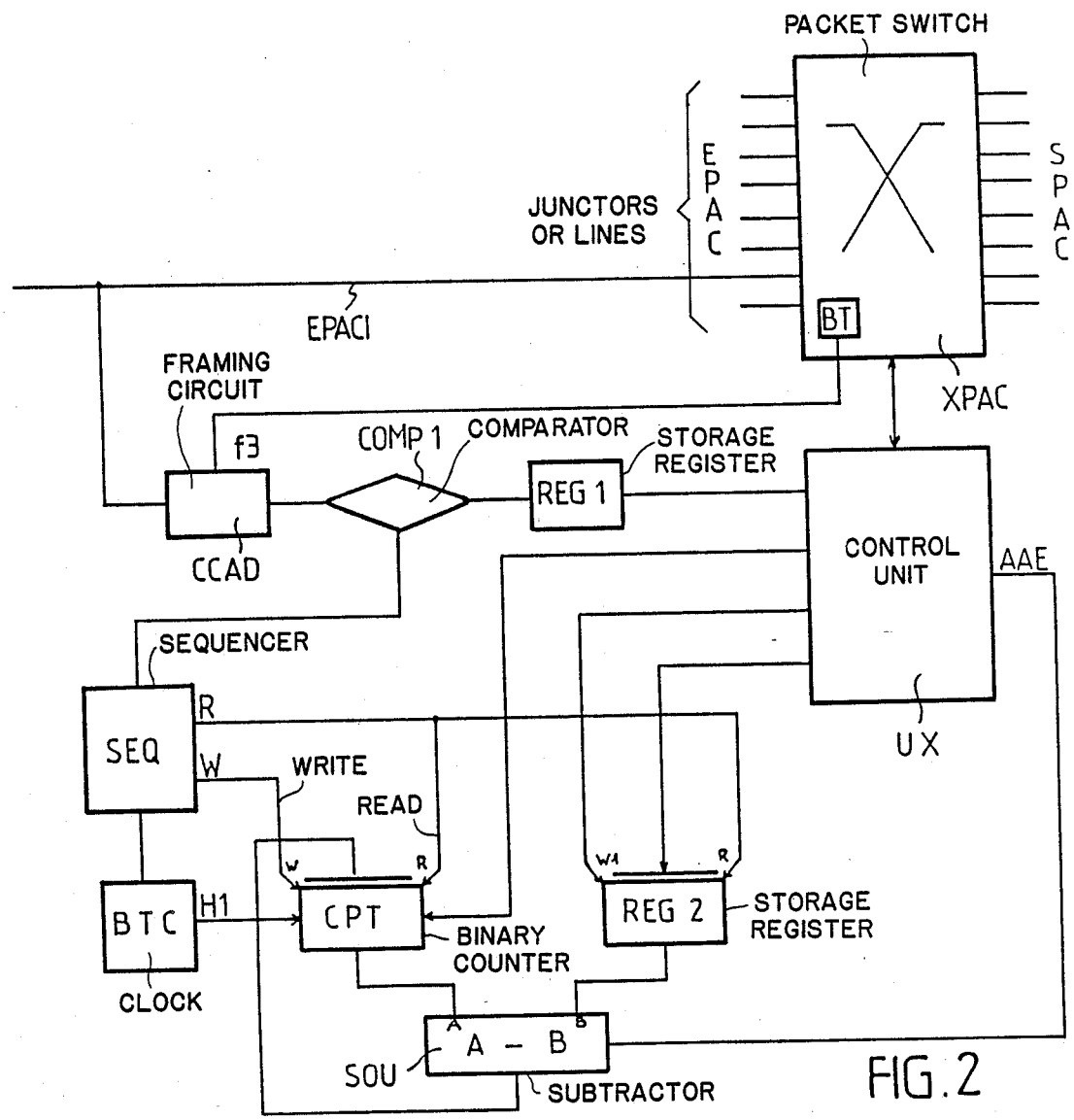
Figure 3:
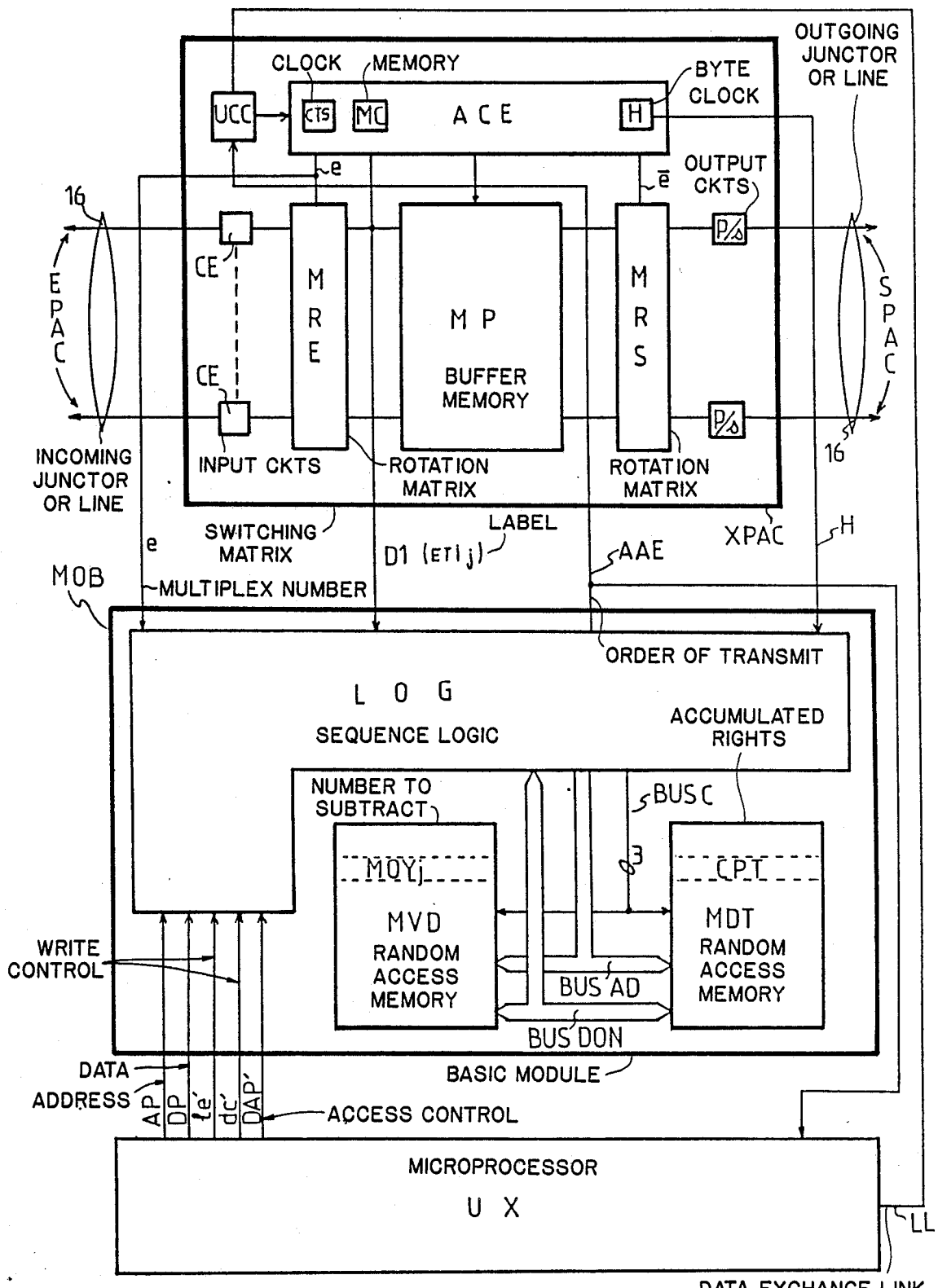
Figure 4:
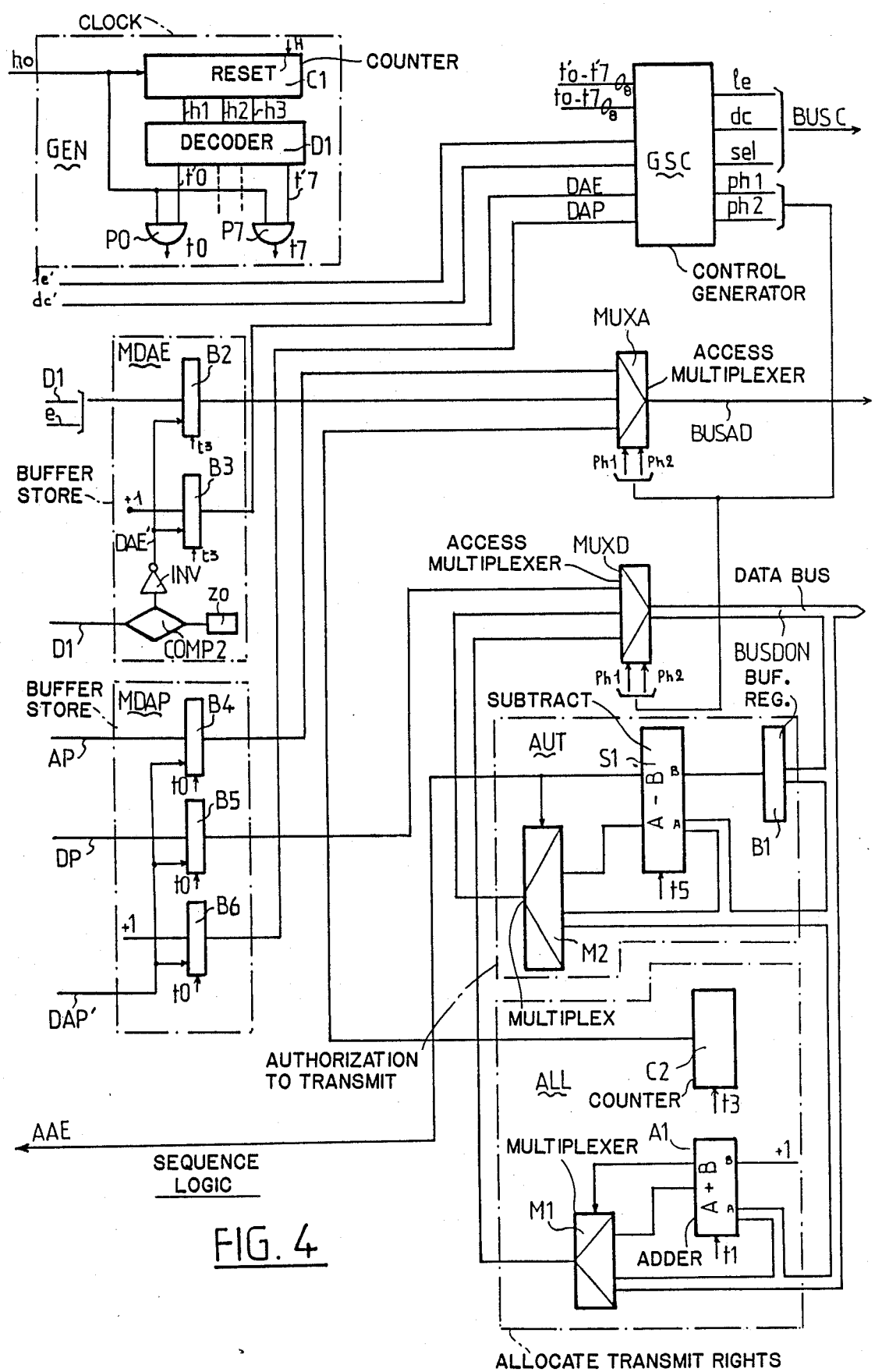
Figure 5:
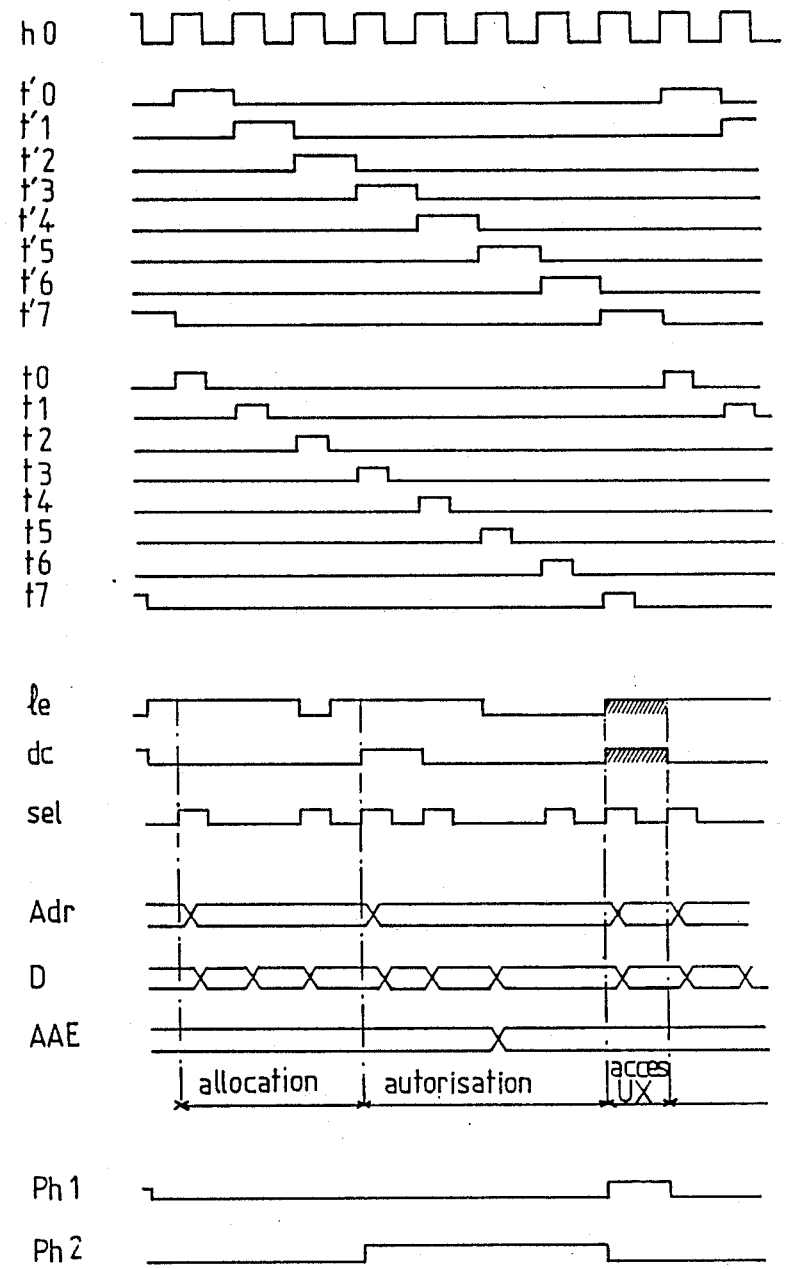

The above-mentioned embodiments of the invention as well as others, will become clearer upon reading the following description of embodiment, the description being done with reference to the attached drawings, among which:

FIG. 1 is a timing diagram illustrating in a general manner the process in accordance with the invention, FIG. 2 is a block diagram of a first embodiment of a system in accordance with the invention, FIG. 3 is a schematic block diagram illustrating another embodiment of the system in acordance with the invention, FIG. 4 is a block diagram of a logic circuit for the system of FIG. 3, and FIG. 5 shows the timing diagrams illustrating the operation of the circuits of Figures 3 and 4.

In FIG. 1 is shown the instantaneous time variation of the flow di generated by a source on a virtual circuit of a multiplexer, as well as an average flow value. From 0 to t1, the instantaneous flow is less than the value dm, which in practice represents the average flow allowed. The positive difference (dm-di) brings about the accumulation of the right to transmit. At the instant t1, which corresponds to the instant where the curve di cuts the line dm, the area of the domain I corresponds to the accumulated number of rights to transmit.

From t1 to t2 which will be defined below, the difference (dm-di) is negative. The number of rights to transmit is decremented. When the area of domain II is equal to that of domain I, which defines the position to t2, all rights to transmit have been restored.

From t2 to t3, where the curve di intersects again the staight line dm in its downward path, the difference (dm-di) is always negative and the number of rights to transmit is nil. No authorization to transmit is given and the data corresponding to the requests for authorization to transmit are eliminated from the network.

After $T_3$, the difference (dm-di) becomes positive again, the authorizations to transmit are given and rights to transmit are once again accumulated.

In FIG. 2 is shown a packet switch XPAC with its input junctions EPAC, its output junctions or lines SPAC and its time base BT. The switch XPAC is controlled and ordered by a control unit UX which establishes the virtual circuits between the input junctions and the output junctions. For the sake of an example, the junctions or lines EPAC and SPAC can transmit the time multiplex such as that which is described in European patent document EP-A-0 108 028 (U.S. Pat. No. 4,603,416) and the switch XPAC can be of the type described in European Patent document EP-A-AO 113 639 U.S. Pat. No. 4,594,708, the control unit UX thus including the control unit UCC which is a part of this autoswitch.

In shunt with one of the input junctions EPAC, namely EPACi, a framing circuit CCAD is shown which is capable of framing the packets carried by the junction EPACi and extracting the labels. One input f3 of the framing circuit is connected to a corresponding output of the time base BT and is intended to synchronize the extraction of labels. The output of circuit CCAD is connected to the first input of a comparator COMP1 whose second input is connected to the output of a storage register REG1 whose loading input is connected to a corresponding output of the control unit UX. The output of comparator COMP1 is connected to the input of a sequencer SEQ with two outputs R and W. The sequencer SEQ also has a clock input connected to an output of a time base BTC. The output R is connected, on one hand, to the read input R of a storage register REG2 and, on the other hand, to the read input R of a binary counter CPT. The output W of the sequencer SEQ is connected to the write input W of counter CPT.

The storage register REG2 has a data input which is connected to a corresponding data output of the control unit UX and a write input W1 which is also connected to a corresponding output of the unit UX. The output of the storage register REG2 is connected to the operand input B of a subtractor SOU.

The binary counter CPT, which is not a cyclic counter, has a data loading input which is connected to the output of subtractor SOU, an incrementing input which is connected to an output H1 of time base BTC, a "1" setting input for each of the cells connected to a corresponding output of the control unit UX and its output is connected to the operand input A of subtractor SOU.

The subtractor SOU, which carries out the subtraction (A-B) has an output with the sign AAE which is enabled when the difference is negative and which is connected to a corresponding input of the control unit UX.

The operation of the circuit of FIG. 2 is as follows. Upon establishing a virtual circuit on the input junction EPACi, the control unit UX assigns it, on one hand, a label at the beginning of each packet, and, on the other hand, an average flow value. In the embodiment described, the label will be "ETIj" and the average flow value "MOYj". The unit UX thus writes the word ETIj in the storage regiser REG1 and the word MOYj in the storage register REG2, then sets the counter CPT to the maximum count through the "1" setting input. In the example described, we will assume that the counter CPT has four cells and the register REG2 has five cells. Finally, we shall assume the value 00011 for the word MOYj.

For each packet carried by the multiplexer of junction EPACi, the circuit CCAD generates the label of comparator COMP1. When the label generated is the word ETIj, the comparator generates a cycle triggering signal to sequencer SEQ. Through its output R, it causes the reading of the contents of counter CPT and of register REG2. The subtractor SOU thus receives at its A input the word 1111 and at its B input the word 00011. (A-B) is, on one hand, positive and, on the other hand, equal to 1100. The output W of sequencer SEQ causes the writing of the word 1100 into counter CPT. While waiting for the next label ETIj, the contents of counter CPT are incremented at the rate of signal H1 supplied by the time base BTC. Thus, it appears that the contents of the counter increases constantly, with however a maximum, for the whole duration of the communication on the virtual circuit concerned.

Two cases can occur:

(1) The average rate of appearance of the labels ETIj is equal or less than that which was foreseen, the contents of counter CPT should thus remain greater than the value of the word MOYj, and all the packets of the communication concerned will be admitted.

(2) The average rate of appearance of the label ETIj becomes greater than the predetermined value, the contents of counter CPT will be reduced, in spite of being incremented at the rate H1 and, at a given time, the difference (A-B) will be negative, the AAE output will be enabled and the control unit UX will order the matrix XPAC not to transmit any more packets having the label ETIj. As we shall see below, in that case the value recopied into the counter CPT is that of the operand A and not the result of the subtraction.

As soon as (A-B) becomes positive again, the transmission can resume.

It may be seen that the value of the two word MOYj is inversely proportional to the average flow allocated and proportional to the frequency of the time base BTC.

We have seen above, that the number of cells, in register REG2, was greater by one unit than the number of cells in counter CPT. This is not necessary, but provides an ease of control easily usable by the control unit UX. In fact, when the unit UX wants to completely disallow a communication, it is sufficient to load the word 11111 into register REG2. B will thus be greater than A. This possibility can be used when the control unit UX has declared a packet source to be in error.

On the other hand, for some communications which it deems of high priority, the control unit UX can load 00000 into register REG2. All the packets of such a communication will be transmitted.

It should be noted that with a switch XPAC, such as that which is described in document EP-A-0 113 639, each label from arriving packets is examined, to route the packet, into a programmable memory intended for this purpose. The unit UX is assumed capable of modifying the contents of this memory, such that upon receiving a disallowed label, there corresponds no routing.

The circuit of FIG. 2 has permitted the description of the basic operation of the packet flow control system in accordance with the invention, but which is applicable to a single communication. In practice, a really efficient control system must allow flow control on the whole set of input multiplex EPAC from a packet switch and, in each multiplex EPACi, all the established virtual circuits. For the sake of an embodiment of the invention, a basic module is provided capable of monitoring 16 entering multiplex from a switching matrix such as that which is shown in FIG. 8 of document EP-A-0 113 639. Hence, there will be as many basic modules as switching matrices in the first stage of a packet switch.

FIG. 3 illustrates a basic module MOB associated with a switching matrix XPAC with 16 entering multiplexer junctions or lines EPAC and 16 outgoing multiplexer junctions or lines SPAC, such as mentioned above, the basic module MOB being controlled by a control unit with a processor UX. In the matrix XPAC, we have shown the input circuits CE of the entering multiplexer junctions or lines EPAC, the rotation matrix MRE, the packet buffer memory MP, the output rotation matrix MRS, the output circuits p/s, the central control unit UCC, the routing circuit ACE including the label conversion memory MC, the time base CTS and the local byte clock H.

Between the matrix XPAC and the module MOB, we have shown the links D1, e, H and AAE. The outgoing link D1 from XPAC generates the successive labels ETI of the packets which enter into the matrix XPAC. It may be recalled, that in accordance with document EP-A-0 113 639, the link D1 is connected to the first output of the input rotation matrix MRE which generates the lables ET1 to memory MC. The link e, coming from the time base CTS, serves to identify the number of the entering multiplex which carries the packet whose label is ETI, the information e carried by this link playing the same role in the matrix XPAC. The link H transmits the internal byte clock H used in the matrix XPAC. The link AAE starts from the basic module MOB towards the unit UCC which deduces the order to transmit to the memory MC to no longer process a particular label ET1 coming from a particular entering multiplexer. The link AAE is also connected to the control unit UX.

Between the basic module MO and the control unit UX, are provided two write control wires le' and dc', addressing wires AP, data wires DP and an access control wire DAP'.

Finally, between the control units UX and UCC is provided a data exchange link LL through which the control unit UCC transmits to the unit UX data concerning the value of the average flow allocated to a newly established communication. These data will be explained below.

The basic module MOB, shown in FIG. 3, comprises a set of sequencing logic LOG, which is shown in detail in FIG. 4, a random access memory MVD containing, for each communication, a value to be subtracted at each request for authorization to transmit, a random access memory MDT containing, for each communication, the accumulated number of rights to transmit, with classically between the set LOG and the memories, data buses BUSDON, addressing buses BUSAD and control buses.

The logic set LOG, FIG. 4, comprises a clock signal generator GEN, a control signal generator GSC, a buffer MDAE storing an authorization to transmit request, a buffer MDAP storing a microprocessor access request from the control unit UX, an access multiplexer MUXA to the address bus BUSAD, an access multiplexer MUXD to the data bus BUSDON, a logic circuit ALL to allocate rights to transmit and a logic circuit AUT to authorize transmission.

The clock signal generator GEN comprises a binary cyclic counter C1 and a logic decoder D1. The counter C1 has a clock input which receives the signal h0 whose frequency is equal to the bit rate on the entering multiplex of the matrix XPAC, and a zero reset input reset which receives from this matrix the signal H at the byte frequency. The counter C1 has three outputs supplying the signals h1, h2 and h3 whose frequencies are respectively one half, one quarter and one eighth that of signal h0. The decoder D1 receives the signals h1 to h3 of counter C1 and processes them logically to supply the signals t'0 to t'7 which are defined by the following logic equations:

$$t'0 = h1 \cdot h2 \cdot h3$$
$$t'1 = \overline{h1} \cdot h2 \cdot h3$$
$$t'2 = h1 \cdot \overline{h2} \cdot h3$$
$$t'7 = \overline{h1} \cdot \overline{h2} \cdot \overline{h3}$$

The seven outputs t'0 to t'7 of decoder D1 are connected to the first inputs of eight AND gates P0 to P7 whose second inputs receive the signal h0 which samples the signals t'0 to t'7 to generate signals t0 to t7. In practice a signal t'i is at a high level for one period of h0 and at the low level during the seven following periods and these signals are shifted one with respect to the other. The signals t0 to t7 have, at the higher level a duration which is half that of t'0 to t'7.

The chronograms h0, t0 to t7, and t'0 to t'7 of FIG. 5 illustrate the signals of the same name respectively.

The transmission rights allocation logic circuit ALL comprises a counter C2, an adder A1 and a multiplexer M1. The counter C2 is a modulo-N counter, where N is the number of words in the random access memories MVD and MDT, and it is incremented at the rate of signal t3. At the end of N periods of signal t3, the counter C1 will have accomplished a complete cycle supplying successively all the addresses of the memories MDT and MVD. The output of counter C2 is connected to the first input of multiplexer MUXA.

The adder A1 has its operand input A connected to the data bus BUSDON. The high level corresponding to a "1" is applied to its B operand input. The adder A1 has its data output connected to the first input of a multiplexer M1 and its overflow input connected to the control input of multiplexer M1, whose second input is connected to the data bus BUSDON. The output of multiplexer M1 is connected to the first input of multiplexer MUXD.

The logic circuit AVT comprises a buffer register B1, a subtractor S1 and a multiplexer M2. The input of the buffer register B1 is connected to the bus BUSDON and its output is connected to the B operand input of subtractor S1 whose A operand input is connected to bus BUSDON. The subtractor S1 has an output which generates the difference (A−B) and which is connected to the first input of multiplexer M2. It also has a sign output which is connected, on one hand, to the control input of multiplexer M2 and, on the other hand, to the output AAE. The second input of multiplexer M2 is connected to bus BUSDON and its output is connected to the second input of multiplexer MUXD.

The buffer circuit MDAE comprises two buffer registers B2 and B3. The input of register B2 is connected to links D1 and e which transmit the data ETIj and e, and its output is connected to the second input of multiplexer MUXA. The register B3 has its input which receives the value "1" and its output which is connected to the DAE input of the control signal generator GSC. The two registers B2 and B3 have write enable inputs which are connected through an inverter INV, to the output of a comparator COMP2 one input of which is connected to link D1 and the other to the output of a register Z0 in which is stored the word corresponding to the label of an empty packet, such as that, for example, described in document EP-A-O 108 028.

Each label ETIj from a packet transmitted by link D1 is compared in comparator COMP2 with the empty packet label. If the result of the comparison is negative, the inverter INV generates the signal DAE′ which indicates that there is a request to authorize transmission. If the result is positive, the signal DAE′ is not transmitted. The signal t3 stores a request for authorization to transmit. The buffer circuit MDAP comprises three buffer registers B4 to B6. The register B4 has its input connected to a bundle of wires AP coming from the control unit UX and its output is connected to the third input of a multiplexer MUXA. The register B5 has its input connected to a bundle of wires DP coming from the control unit UX and its output is connected to the third input of multiplexer MUXD. The register B6 receives at its input the value "1" and its output is connected to the input DAP of the control signal generator GSC. The three registers B4 to B6 have write enable inputs which are connected, in parallel to the output DAP′ of the control unit UX. The signal t0 stores the access request from the unit UX.

The multiplexer MUXA has its output connected to the address bus BUSAD while the multiplexer MUXD has its output connected to bus BUSDON.

The inputs of control signal generator GSC are the inputs DAE and DAP, already mentioned, the signal inputs t′0 to t′7 and t0 to t7 connected to the generator GEN, and the inputs le′ and dc′ which are connected to the corresponding outputs of the control unit UX. The generator GSC generates, at its corresponding outputs, the signals le, dc and sel, towards the control bus BUSC and signals Ph1 and Ph2 towards the control inputs of multiplexers MUXA and MUXD.

The generator GSC is a logic circuit which resolves the following logic equations:

$$
\begin{aligned}
sel &= t0 + t2 + DAE \cdot (t3 + t4 + t6) + DAP \cdot t7 \\
dc &= DAE \cdot t3 + DAP \cdot t7 \cdot dc' \\
le &= (t'0 + t'1 + t'2 + t'3 + t'4 + t'5 + t'6) + 1 \cdot t'7 \\
Ph1 &= 0 \cdot (t'0 + t'1 + t'2 + t'3 + t'4 + t'5 + t'6) + 1 \cdot t'7 \\
Ph2 &= 0 \cdot (t'0 + t'1 + t'2 + t'3) + 1 \cdot (t'3 + t'4 + t'5 + t'6)
\end{aligned}
$$

The timing diagram for the signals le, dc, sel, Ph1 and Ph2 are shown in FIG. 5. The signal sel is at the high level to trigger all read or write operation in one or the other of memories MVD and MDT. The signal le/ triggers a write operation into the memory MDT. The signal dc routes the reading or writing towards the memory MVD while the signal dc/ routes the reading towards memory MDT.

The combination of signals Ph1/ and Ph2/ point the multiplexers MUXA and MUXD towards the outputs of counter C2 and multiplexer M1, respectively, to allow the allocation phase. The combination Ph1/ and Ph2/ point the multiplexers MUXA and MUXD to the output of buffer B2 and the output of multiplexer M2, respectively, to allow the authorization phase. The combination Ph1 and Ph2/ point the multiplexers MUXA and MUIXD to the outputs of buffers B4 and B5 respectively, to allow read or write access from the microprocessor of the unit UX. In FIG. 5, we have shown the three operational phases: allocation, authorization and access to UX.

The allocation phase starts at time t0 with sel.le.dc/ with the transmission, through MUXA, of the address contained in counter C2 to bus BUSAD in order to read the word CPT corresponding to this address in memory MDT. This word CPT is transmitted, by the bus BUSDON, to the operand input A of adder A1 which is enabled during the time t1. At the time t2, the output of adder A1 displays the word (CPT+1). Whether its overflow output is enabled or not, the multiplexer M1 causes the word CPT or (CPT+1) to go to multiplexer MUXD in order to immediately rewrite this word at the same address in memory MDT. In practice, the set of circuits A1 and M1 has the only purpose of preventing an untimely return to zero of the word CPT when it has reached its upper limit.

The authorization phase starts at time t3 with sel.le.dc by the transmission, through MUXA, of the address contained in buffer B2 towards the bus BUSAD in order to read the word MDYj corresponding to this address in memory MVD. This word MOYj is transmitted, by the bus BUSDON, to the input of buffer B1. At time t4, with sel.le.dc/, at the same address, but in memory MDT, the corresponding word CPT is read and applied, by the bus BUSDON, to the operand input A of subtractor S1, which receives at its B operand input, the word JOYj contained in buffer B1. The subtraction is carried out at time t5. If the result of the operation is positive, the link AAE is at the low level and this result is transmitted by the multiplexers M2 and MUXD to be written in memory MDT and become the new word CPT, always at the same address. If the result is negative, the link AAE is at the high level, such that the multipelxer M2 transmits to multiplexer MUXD the previous word CPT which is rewritten in memory MDT.

Of course, this authorization phase is only carried out if the signal DAE' is transmitted by the inverter INV, that is the label received is not that of an empty packet. In other respects, we must note that at time t3, the counter C2 has been incremented in anticipation of the next allocation phase.

The access phase to UX starts at time t7 and allows the unit UX:
with sel.le.dc, to read in the memory MVD,
with sel.le/.dc, to write in the memory MVD,
with sel.le.dc/, to read in the memory MDT, and
with sel.le/.dc/, to write in the memory MDT.

During reading or writing, the multiplexer MUXA transmits the address contained in buffer B4 to bus BUSAD. During writing, the data to be written goes from buffer B5 to bus BUSDON through multiplexer MUXD. During reading, the data read is transmitted to the unit UX directly by the bus BUSDON.

It may be seen that a complete cycle lasts eight periods of h0, that is eight bit durations of the packets transmitted on the entering multiplex junctions EPAC. Thus, each label appearing on the link D1 can be processed in real time.

It may also be seen that upon establishing a virtual circuit, the control unit UX can decide to write an initial number CPT into the memory MDT at the address of the virtual circuit. If this initial number is nil, it is because the control unit assigns a delay at the transmission of the source.

In the example described in relation to FIG. 2, we had assumed, otherwise, that a maximum value was given to CPT.

It may be seen that each time a communication is established, only the value of the word MOYj need necessarily be fixed by the control unit, which makes the system of the invention very easy to carry out.

The embodiments of the invention in which an exclusive property or privilege is claimed are defined as follows:

1. A process for controlling the flow of data packets carried on a plurality of virtual circuits from a plurality of multiple demands, said process comprising the steps of:
    (a) identifying each of said data packets in response to each request for an authorization to transmit, each data packet being identified by a label included in said packet and by an identification of a multiplex channel carrying the data packet;
    (b) measuring the flow of data packets flowing on each of said virtual circuits and comparing said measured flow with an average rate to determine whether the measured flow is positive, negative, or null with respect to said average rate;
    (c) if the flow compared in step (b) indicates that the measured flow of data packets is positive with respect to the average flow rate, giving an authorization to transmit and translating into rights to transmit which are proportional to the time which has elapsed since the last previous request for a transmission authorization, the rights to transmit being accumulated;
    (d) if the flow compared in step (b) indicates that the measured flow of data packets is negative with respect to the average flow rate, and if the accumulated rights to transmit are positive, giving an authorization to transmit and decrementing said accumulated rights; and
    (e) if the flow compared in step (b) indicates that the measured flow of data packets is negative with respect to the average flow rate and if the accumulated right are nil, denying an authorization to transmit.

2. The process of claim 1 and the further step of:
    (1) initially allocating first and second numbers to each of said virtual circuits, said first number representing the accumulated transmission rights and said second number representing an average rate of data packet flow allocated to the concerned virtual circuit, incrementing said first number at a fixed rate which is independent of the flow of the concerned virtual circuit having said first number allocated thereto, computing a difference between said first and second number assigned to the concerned virtual circuit in response to each request for an authorization to transmit which is received from the virtual circuit,
    (2) if the sign of the difference computed in step (1) is positive, generating an authorization to transmit and a substitution of the computed difference for the first number allocated to said concerned virtual circuit, and
    (3) if the sign of the difference computed in (1) is negative, generating a signal forbidding transmission and preserving the existing first number.

3. The process of claim 1 or 2 further including the steps of generating a signal requesting the concerned virtual circuit to reduce the rate at which its data packets flow in response to a non-authorization of transmission signal and of returning a message to said concerned virtual circuit indicating any loss of said data packets during transmission.

4. The process of claim 2 wherein said second number is larger than an upper limit of said first number in order to forbid the transmission of packets of the pertinent virtual circuit.

5. The process of claim 2 wherein said second number is nil in order to transmit all data packets of the pertinent virtual circuit.

6. A system for controlling the flow of data packets carried on a virtual circuit, said system comprising, a first detector of transmission authorization requests, a clock for delivering periodic clock signals, a counter having an input and output, a storage register having an output, a subtractor having operand inputs and an output, a second detector for detecting the arithmetic sign of the output of the subtractor, a control unit, the outputs of the counter and the storage register being connected to the operand inputs of the subtractor, the output of said subtractor being connected to the input of the counter, the input of the counter receiving the periodic clock signal, means responsive to the control unit for loading the storage register at the initial establishment of said virtual circuit, means responsive to each output signal of the first detector for triggering an operation of the second detector, and means responsive to an output signal at a low level from said second detector for bringing about a trasmission of an authorization to transmit the data packet and for loading the result of the subtractor into the counter and responsive to a high level for forbidding any transmission of packets via the virtual circuit.

7. The system in accordance with claim 6 and a plurality of virtual circuits, asynchronous time multiplexers including packet switch means, means for managing all of the virtual circuits in response to processing by said packet switch means, said system further comprising a first memory storing first numbers developed from said output signal of said first detector, and a second memory storing second numbers developed from said output signal of said second detector, and addresses of the first and second memories being determined by the identities of the packets entering into the said packet switch means.

* * * * *